US006910092B2

(12) United States Patent
Calvignac et al.

(10) Patent No.: US 6,910,092 B2
(45) Date of Patent: Jun. 21, 2005

(54) CHIP TO CHIP INTERFACE FOR INTERCONNECTING CHIPS

(75) Inventors: Jean Louis Calvignac, Cary, NC (US); Marco Heddes, Cary, NC (US); Kerry Christopher Imming, Rochester, MN (US); Joseph Franklin Logan, Raleigh, NC (US); Tolga Ozguner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/016,800

(22) Filed: Dec. 10, 2001

(65) Prior Publication Data

US 2003/0110339 A1 Jun. 12, 2003

(51) Int. Cl.[7] .............................................. G06F 13/00
(52) U.S. Cl. ........................ 710/310; 370/229; 710/307
(58) Field of Search ................................. 710/307, 310, 710/315, 57, 71, 72, 52; 370/229, 235, 236; 709/249, 250

(56) References Cited

U.S. PATENT DOCUMENTS

| 5,105,424 A | 4/1992 | Flaig et al. ................. 370/94.1 |
| 5,802,055 A | 9/1998 | Krein et al. .................. 370/402 |
| 5,845,072 A | * 12/1998 | Finney et al. ................ 709/208 |
| 5,954,810 A | 9/1999 | Toillon et al. ................ 710/129 |
| 5,987,554 A | 11/1999 | Liu et al. ..................... 710/129 |
| 6,018,782 A | 1/2000 | Hartmann et al. ........... 710/129 |
| 6,104,696 A | 8/2000 | Kadambi et al. ............ 370/218 |
| 6,321,280 B1 | * 11/2001 | Koike et al. ................... 710/52 |
| 6,505,267 B2 | * 1/2003 | Luke et al. .................... 710/52 |
| 6,742,063 B1 | * 5/2004 | Hellum et al. ................. 710/52 |
| 2003/0081552 A1 | * 5/2003 | Goetzinger et al. ......... 370/235 |

OTHER PUBLICATIONS

Pending Patent Application, J. L. Calvignac et al., "High Speed Network Processor", U.S. Appl. No. 09/838,395, filed Apr. 19, 2001, priority date Mar. 5, 2001.

IBM Technical Disclosure Bulletin, vol. 38, No. 02 Feb. 1995, "IEEE P1394 Link Level Virtual First In/First Outs for Command Block and Status Block Reception and Signaling", pp. 603–606.

* cited by examiner

Primary Examiner—Glenn A. Auve
(74) Attorney, Agent, or Firm—Joscelyn G. Cockburn

(57) ABSTRACT

A Network Processor (NP) is formed from a plurality of operatively coupled chips. The NP includes a Network Processor Complex (NPC) Chip coupled to a Data Flow Chip and Data Store Memory coupled to the Data Flow Chip. An optional Scheduler Chip is coupled to the Data Flow Chip. The named components are replicated to create a symmetric ingress and egress structure. Communications between the chips are provided by a pair of Chip to Chip Macros, one of each operatively positioned on one of the chips, and a Chip to Chip Bus Interface operatively coupling the Chip to Chip Macros.

27 Claims, 10 Drawing Sheets

CHIP TO CHIP INTERFACE FOR INTERCONNECTING CHIPS

CROSS-REFERENCE TO RELATED PATENT APPLICATIONS

The present application relates to patent application Ser. No. 09/838,395, "High Speed Network Processor" which is assigned to the assignee of the present invention. The patent application Ser. No. 09/838,395 "High speed Network Processor" describes a high performance network processor formed from multiple interconnected chips and is fully incorporated herein by reference.

The present application describes and claims an interface macro which can be used to interconnect the chips of the "High Speed Network Processor".

BACKGROUND OF THE INVENTION a) Field of the Invention

The present invention relates to communications networks in general and in particular to circuits used to interconnect chips or modules of a communication system.

b) Prior Art

The ever-increasing requirement for higher performance and data throughput in networking and computing applications creates the need for Application Specific Integrated Circuits (ASICs) with higher numbers of physical input/output pins, or "I/Os". Unfortunately ASIC packaging technology can implement only a finite number of I/Os. As the number of I/Os on an ASIC package is increased beyond a practical limit, it creates electrical and mechanical problems that degrade the performance and reliability of the ASIC.

In applications where the number of I/Os required exceeds the limits of ASIC packaging, the only option is to split what would have been a single ASIC into multiple ASIC chips. But splitting one ASIC chip into multiple ASICs chips often presents additional challenges with respect to the number of I/Os then required for communication between each of the ASICs in addition to the I/Os required by the originally intended external interfaces.

In view of the above circuits and method are required to interconnect chips without necessarily increasing the number of pins used in making such interconnections.

SUMMARY OF THE INVENTION

The present invention provides a "Macro" that provides communication between Macros on separate chips. As used in this document Macro means a set of circuits that are a subset of circuits on a chip or ASIC. The interconnecting Macros (termed Chip to Chip Macro) minimize the number of Input/Output (I/O) pins used for communication between chips, thereby maximizing the number of total I/Os available for supporting the application's external interfaces. In operation the Chip to Chip Macros aggregate all communications between the two chips into a single high speed Chip to Chip Bus that connects the two chips. ASIC, chip and modules are used interchangeably herein.

In particular, an interconnecting Macro is operatively integrated within each chip to be interconnected. Each interconnecting Macro includes a Transmit section and a Receive section. The transmit section on one chip communicates with the receive section on the other chip via a first Chip to Chip Bus Interface which transmit information in only one direction. Likewise, the receive section on said one chip receives information from the transmit section of the other chip via a second Chip to Chip Bus Interface which transmits data in only one direction.

The transmit section of the interconnecting Macro includes Transmitter Multiplexor (Tx MUX), Tx Speed Matching Device and Serializer. The Tx MUX, Tx Speed Matching Device and Serializer are serially interconnected and positioned in the transmitter section.

The receiver section of the interconnecting macro includes a Rx Demux (Receive Demultiplexor), Rx Speed Matching Device and Deserializer. The Rx Demux Speed Matching Device and Deserializer are connected in series and placed within the Receiver Section.

The circuits on each chip are grouped into functional blocks hereinafter termed Macros. As stated above Macro is a collection or subset of electrical circuits performing specific functions. Examples of function implemented as Macros include microprocessors, ethernet controller, PCI Bus interface encryption/decryption engines, etc.

Typically, if everything is on the same chip, then there is no need to have any chip to chip macros. The chip to chip macros would normally be introduced as a decision is made to split a function across two chips. When on the same chip there may be thousands of signals between two macros. If the macros are placed on separate chips, then it is not practical to have thousands of I/O pins between the two chips. Therefore chip to chip macros are introduced which aggregate the communication between the two macros over a high-speed, lower I/O pin count bus. Later, one might decide to redesign (and re-fabricate) the two chips to put all the function back into one chip (for cost reduction, etc.) In this case the chip to chip macros are simply removed and the signals are connected directly between the original two macros without need for redesign of the macros themselves.

When the Macros are on different chips the signals are transmitted over I/O interfaces. The present invention minimizes the number of I/O pins required to transmit the information between pairs of macros located on different chips. The Chip to Chip Macro of the present invention intercepts request signals generated by other macros, on one chip wishing to communicate with paired macros on another chip. The Chip to Chip Macro forms a data packet that is transmitted via the Chip to Chip Interface Bus to the Chip to Chip Macro on the other chip which converts the data packet to electrical signals and forwards the signals to the paired Chip to Chip Macro.

Other features of the present invention will be apparent from the accompanying drawings and detailed description that follows.

DETAILED DESCRIPTION OF THE PREFERRED EMBODIMENT

The above cross reference patent application is fully incorporated herein by reference and, if required, forms part of the disclosure for the present invention.

The present invention provides a Chip to Chip (C2C) Macro 56 (FIG. 2) which is mounted on the Network Processor chip, the Data Flow Chip or the Scheduler Chip and provide a facility for communications between the chips. The chips are interconnected to form a Network Processor. The portions of the referenced application describing the Network Processor and the respective chips forming said Network Processor are reproduced followed by a description of the Chip to Chip Macro and Chip to Chip Interface Bus.

Figure 1:
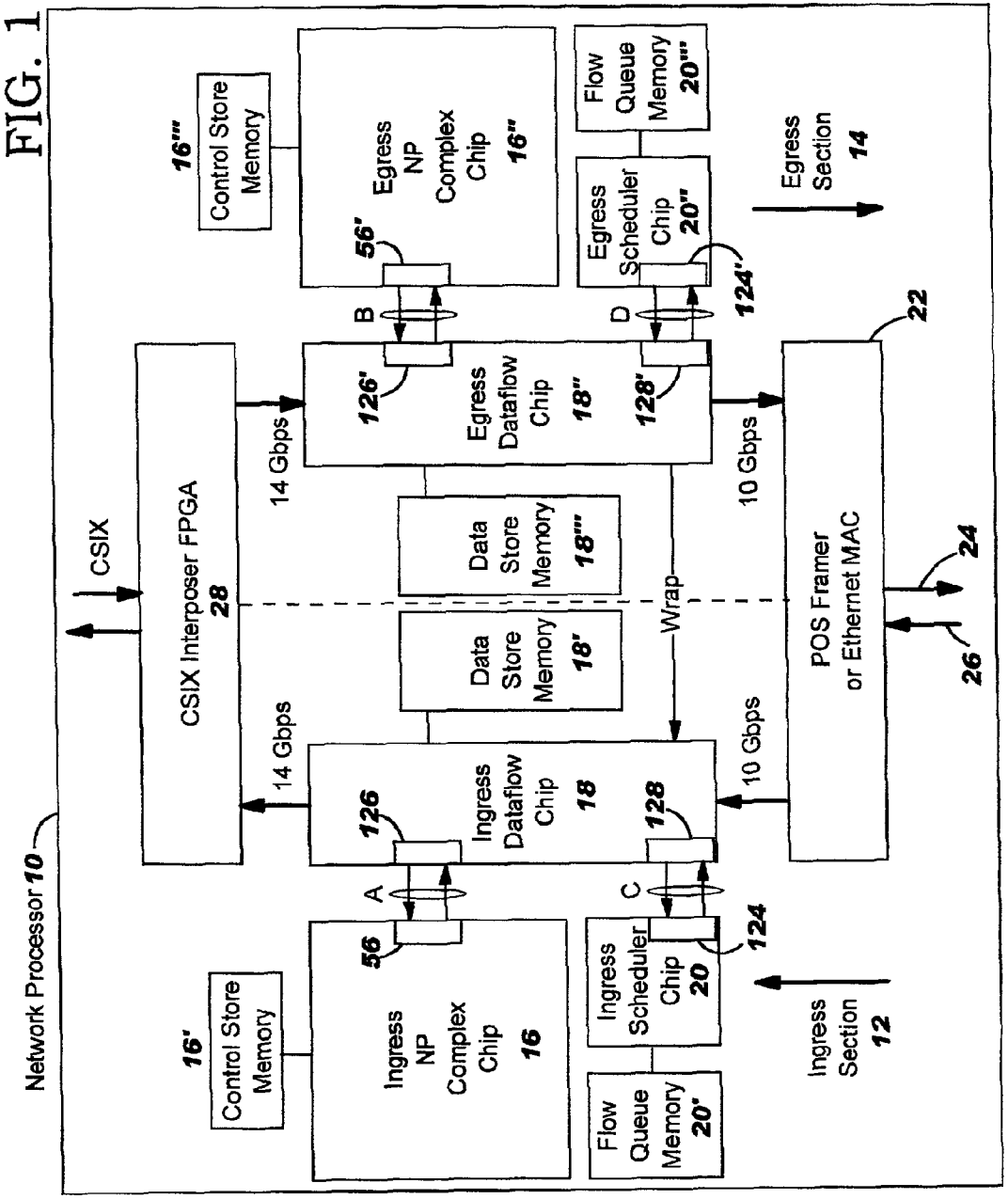
FIG. 1 shows a block diagram of a multichip Network Processor in which the present invention can be used to interconnect the chips.

FIG. 1 shows a block diagram of a Network Processor according to the teachings of the present invention. The Network Processor 10 includes an Ingress section 12 and Egress section 14 symmetrically arranged into a symmetrical structure. The Ingress section includes Ingress Network Processor (NP) Complex Chip 16, Ingress Data Flow Chip 18 and Ingress Scheduler Chip 20. As will be explained subsequently, the Ingress Scheduler Chip 20 is optional and the Ingress section could operate satisfactorily without the Ingress Scheduler Chip. Control Store Memory 16' is connected to Ingress NP Complex Chip 16. A Data Store Memory Chip 18' is connected to Ingress Data Flow Chip 18. Flow Queue Memory 20' is connected to Ingress Scheduler Chip 20.

Still referring to FIG. 1, the Egress Section 14 replicates the chips and storage facilities enunciated for the Ingress Section 12. Because the chips and memories in the Egress Section 14 are identical to those in the Ingress Section 12, chips in the Egress Section 14 that are identical to chips in the Ingress Section 12 are identified by the same base numeral. As a consequence, Egress Data Flow Chip is identified by numeral 18" and so forth. A media interface 22 which can be a Packet Over SONET (POS) framer, Ethernet MAC or other types of appropriate interface, interconnects Network Processor 10 via transmission media 26 and 24 to a communications network (not shown). The media interface 22 can be a POS framer or Ethernet MAC. If a Packet Over SONET framer, it would interconnect one OC-192, 4×OC-48, 16×OC-13 or 64×OC-3 channels. Likewise, if an Ethernet MAC is the media interface it could connect one 10 Gbps channel, 10×1 Gbps channels or 64×100 Mbps channels. Alternately, any arrangement in the Packet Over SONET grouping or Ethernet grouping which produces 10 Gbps data into the chip or out of the chip can be selected by the designer.

Still referring to FIG. 1, the CSIX interposer interface 28 provides an interface into a switching fabric (not shown). The CSIX is a standard interface implemented in a Field Programmable Gate Array (FPGA). "CSIX" is the acronym used to describe the "Common Switch Interface Consortium". It is an industry group whose mission is to develop common standards for attaching devices like network processors to a switch fabric. Its specifications are publicly available at www.cslx.org. The "CSIX Interposer FPGA" converts the "SPI-4 Phase-1" bus interface found on the Data Flow Chip into the CSIX switch interface standard defined in the CSIX specifications. This function could also be designed into an ASIC, but it is simple enough that it could be implemented in an FPGA avoiding the cost and complexity of designing and fabricating an ASIC.

It should be noted other types of interfaces could be used without deviating from the teachings of the present invention. The switching fabric could be the IBM switch known as PRIZMA or any other cross bar switch could be used. Information from the Egress Data Flow Chip 18" is fed back to the Ingress Data Flow Chip 18 via the conductor labeled WRAP. The approximate data rate of information within the chip is shown as 10 Gbps at the media interface and 14 Gbps at the switch interface. These figures are merely representative of the speed of the Network Processor and higher speeds than those can be obtained from the architecture shown in FIG. 1.

It should also be noted that one of the symmetrical halves of the Network Processor could be used with reduced throughput without deviating from the spirit and scope of the present invention. As stated previously, each half of the Network Processor (FIG. 1) contains an identical chip set. This being the case, the description of each chip set forth below are intended to cover the structure and function of the chip whether the chip is in the Egress side or Ingress side.

To interconnect the Chips, Chip to Chip Macros 56 and 56' interconnect the NP Complex Chips, via Chip to Chip Interface Busses A and B, to the Data Flow Chips 18 and 18". Likewise, Chip to Chip Macros 124 and 124' interconnect the Scheduler Chips, via Chip to Chip Interface Busses C and D, to Data Flow Chips 18 and 18". Chip to Chip Macros 126, 128, 126' and 128' are mounted on the Data Flow Chips 18 and 18' and communicate with paired Chip to Chip Macros on the NP Complex Chips 16, 16' and Scheduler Chips 20, 20". Details of the Chip to Chip Macros and Chip to Chip Interface will be given herein.

Figure 2:
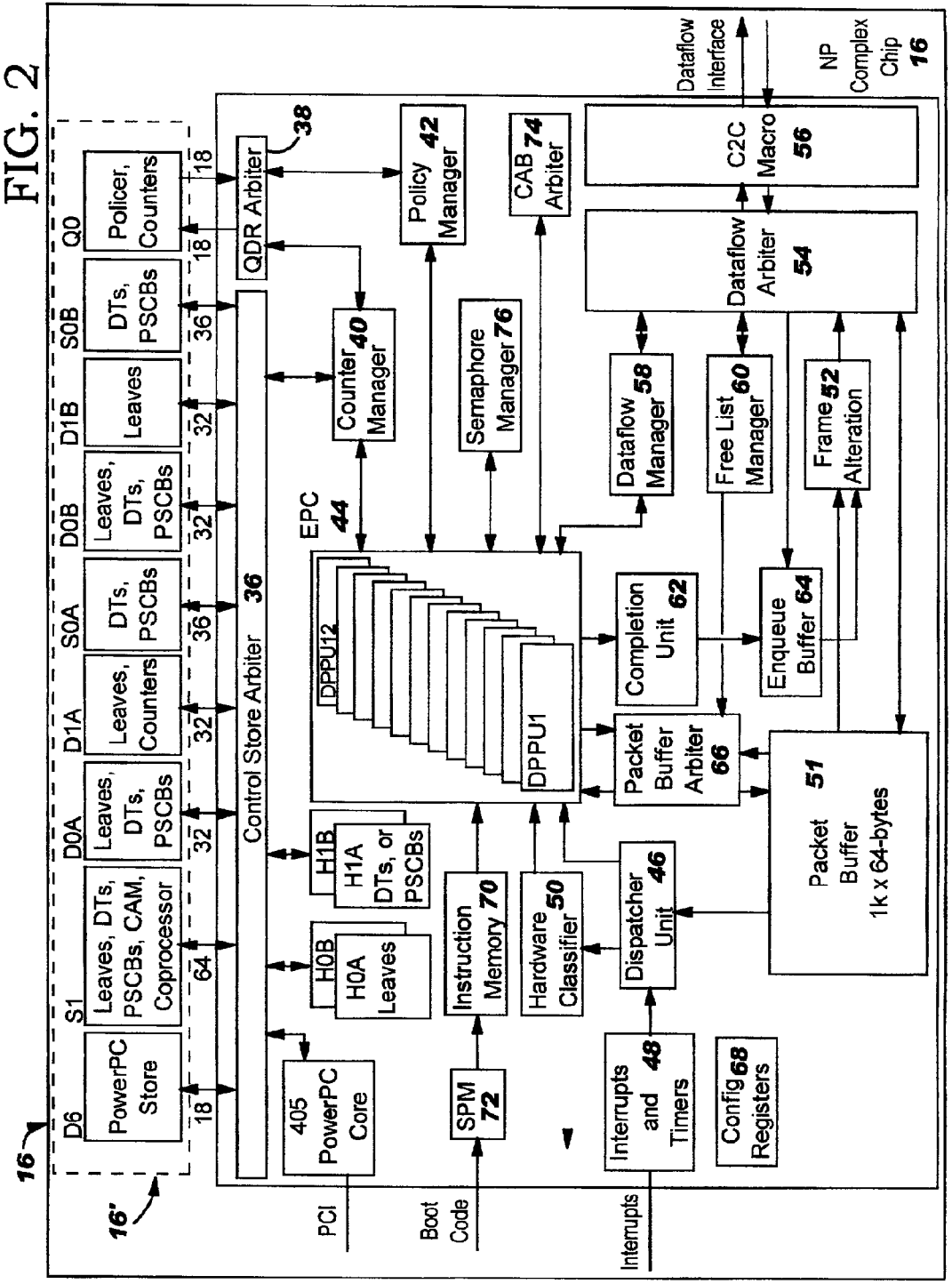
FIG. 2 shows a block diagram of the Network Processor Complex Chip.

FIG. 2 shows a block diagram of the Network Processor Complex Chip 16. The Network Processor Complex Chip executes the software responsible for forwarding network traffic. It includes hardware assist functions to be described hereinafter for performing common operations such as table searches, policing, and counting. The Network Processor Complex Chip 16 includes a control store arbiter 36 that couples the Network Processor Complex Chip 16 to the control store memory 16'. The control store memory 16' includes a plurality of different memory types identified by numerals D6, S1, D0A, D1A, S0A, D0B, D1B, and S0B. Each of the memory elements are connected by appropriate bus to the Control Store Arbiter 36. In operation, the control store arbiter 36 provides the interface which allows the Network Processor Complex Chip 16 access to store control memory 16'.

Still referring to FIG. 2 it should be noted that each of the control memories store different types of information. The type of information which each memory module stores is listed therein. By way of example D6 labeled PowerPC stores information for the 405 PowerPC core embedded in NP Complex Chip 16. Likewise, storage element labeled S1 stores leaves, direct tables (DTs), pattern search control blocks (PSCBs). The information is necessary to do table look-ups and other tree search activities. Likewise, D0A stores information including leaves, DTs, PSCBs. In a similar manner the other named storage stores information which are identified therein. The type of information stored in these memories are well known in Network Processor technology. This information allows data to be received and delivered to selected ports within the network. This type of information and usage is well known in the prior art and further detailed description is outside the scope of this invention and will not be given.

Still referring to FIG. 2, QDR arbiter 38 couples the counter manager 40 and policy manager 42 to Q0 memory module which stores policy control blocks and counters. The counter manager assists in maintenance of statistical counters within the chip and is connected to control store arbiter 36 and embedded processor complex (EPC) 44. The policy manager 42 assists in policing incoming traffic flows. "Policing" is a commonly understood term in the networking industry which refers to function that is capable of limiting the data rate for a specific traffic flow. For example, an internet service provider may allow a customer to transmit only 100 Mbits of data on their Internet connection. The policing function would permit 100 Mbits of traffic and no more to pass. Anything beyond that would be discarded. If the customer wants a higher data rate, then they can pay more money to the internet service provider and have the policing function adjusted to pass a higher data rate. It maintains dual leaky bucket meters on a per traffic flow basis with selectable parameters and algorithms.

Still referring to FIG. 2 the embedded processor complex (EPC) 44 includes 12 dyadic protocol processor units (DPPUs) which provides for parallel processing of network traffic. The network traffic is provided to the EPC 44 by dispatcher unit 46. The dispatcher unit 46 is coupled to interrupts and timers 48 and hardware classifier 50. The hardware classifier 50 assists in classifying frames before they are forwarded to the EPC 44. Information into the dispatcher is provided through packet buffer 51 which is connected to frame alteration logic 52 and data flow arbiter 54. The data flow arbiter 54 is connected by a Chip to Chip (C2C) macro 56 which is coupled to the data flow interface. The C2C macro provides the interface that allows efficient exchange of data between the Network Processor chip and the Data Flow chip.

The data flow arbiter 54 provides arbitration for the data flow manager 58, frame alteration 52 and free list manager 60. The data flow manager 58 controls the flow of data between the NP Complex Chip 16 and the Data Flow chip (FIG. 1). The free list manager 60 provides the free list of buffers that is available for use. A completion unit 62 is coupled to EPC 44. The completion unit provides the function which ensures that frames leaving the EPC 44 are in the same order as they were received. Enqueue buffer 64 is connected to completion unit 62 and Frame Alteration 52 and queues frames received from the completion unit to be transferred to the Data Flow chip through the Chip to Chip Macro 56. Packet buffer arbiter 66 provides arbitration for access to packet buffer 51. Configuration registers 68 stores information for configuring the chip. An instruction memory 70 stores instructions which are utilized by the EPC 44. Access for boot code in the instruction memory 70 achieved by the Serial/Parallel Manager (SPM) 72. The SPM loads the initial boot code into the EPC following power-on of the NP Complex Chip.

The interrupts and timers 48 manages the interrupt conditions that can request the attention of the EPC 44. CAB Arbiter 74 provides arbitration for different entities wishing to access registers in the NP Complex Chip 16. Semaphore manager 76 manages the semaphore function which allows a processor to lock out other processors from accessing a selected memory or location within a memory. A PCI bus provides external access to the 405 PowerPC core. On chip memories H0A, H0B, H1A and H1B are provided. The on chip memories are used for storing leaves, DTs (Direct Tables) or pattern search control blocks (PSCBs). In one implementation H0A and H0B are 3K×128 whereas H1A and H1B are 3K×36. These sizes are only exemplary and other sizes can be chosen depending on the design.

Still referring to FIG. 2 each of the 12 DPPU includes two picocode engines. Each picocode engine supports two threads. Zero overhead context switching is supported between threads. The instructions for the DPPU are stored in instruction memory 70. The protocol processor operates on a frequency of approximately 250 mhz. The dispatcher unit 46 provides the dispatch function and distributes incoming frames to idle protocol processors. Twelve input queue categories permit frames to be targeted to specific threads or distributed across all threads. The completion unit 62 functions to ensure frame order is maintained at the output as when they were delivered to the input of the protocol processors. The 405 PowerPC embedded core allows execution of higher level system management software. The PowerPC operates at approximately 250 mhz. An 18-bit interface to external DDR SDRAM (D6) provides for up to 128 megabytes of instruction store for the 405 PowerPC, manufactured by IBM Corporation®. A 32-bit PCI interface is provided for attachment to other control point functions or for configuring peripheral circuitry such as MAC or framer components. The interface provided by respective ones of the memory module are marked thereon.

Still referring to FIG. 2 the hardware classifier 50 provides classification for network frames. The hardware classifier parses frames as they are dispatched to protocol processor to identify well known (LAYER-2 and LAYER-3 frame formats). The output of classifier 50 is used to precondition the state of picocode thread before it begins processing of each frame.

Among the many functions provided by the Network Processor Complex Chip 16 is table search. Searching is performed by selected DPPU the external memory 16' or on-chip memories H0A, H0B, H1A or H1B. The table search engine provides hardware assists for performing table searches. Tables are maintained as Patricia trees with the termination of a search resulting in the address of a "leaf" entry which picocode uses to store information relative to a flow. Three table search algorithms are supported: Fixed Match (FM), Longest Prefix Match (LPM), and a software managed tree (SMT) algorithm for complex rules-based searches. The search algorithms are beyond the scope of this invention and further description will not be given hereinafter.

Control store memory 16' provides large DRAM tables and fast SRAM tables to support wire speed classification of millions of flows. Control store includes two on-chip 3K×36 SRAMs (H1A and H1B), two on-chip 3K×128 SRAMs (H0A and H0B), four external 32-bit DDR SDRAMS (D0A, D0B, D1A, and D1B), two external 36-bit ZBT SRAMs (S0A and S0B), and one external 72-bit ZBT SRAM (S1). The 72-bit ZBT SRAM interface may be optionally used for attachment of a contents address memory (CAM) for improved lookup performance. The numerals such as 18, 64, 32,etc. associated with bus for each of the memory elements, in FIG. 2 represent the size of the data bus interconnecting the respective memory unit to the control store arbiter. For example, 18 besides the bus interconnecting the PowerPC memory D6 to control store arbiter 36 indicates that the data bus is 18 bits wide and so forth for the others.

Still referring to FIG. 2, other functions provided by the Network Processor Complex Chip 16 includes frame editing, statistics gathering, policing, etc. With respect to frame editing the picocode may direct-edit a frame by reading and writing data store memory attached to the data flow chip (described herein). For higher performance, picocode may also generate frame alteration commands to instruct the data flow chip to perform well known modifications as a frame is transmitted via the output port.

Regarding statistic information a counter manager 40 provides function which assists picocode in maintaining statistical counters. An on chip 1K×64 SRAM and an external 32-bit QDR SRAM (shared with the policy manager) may be used for counting events that occur at 10 Gbps frame interval rates. One of the external control stores DDR SDRAMs (shared with the table search function) may be used to maintain large numbers of counters for events that occur at a slower rate. The policy manager 42 functions to assist picocode in policing incoming traffic flows. The policy manager maintains up to 16K leaky bucket meters with selectable parameters and algorithms. 1K policing control blocks (PolCBs) may be maintained in an on-chip SRAM. An optional external QDR SRAM (shared with the counter manager) may be added to increase the number of PolCBs to 16K.

Figure 3:
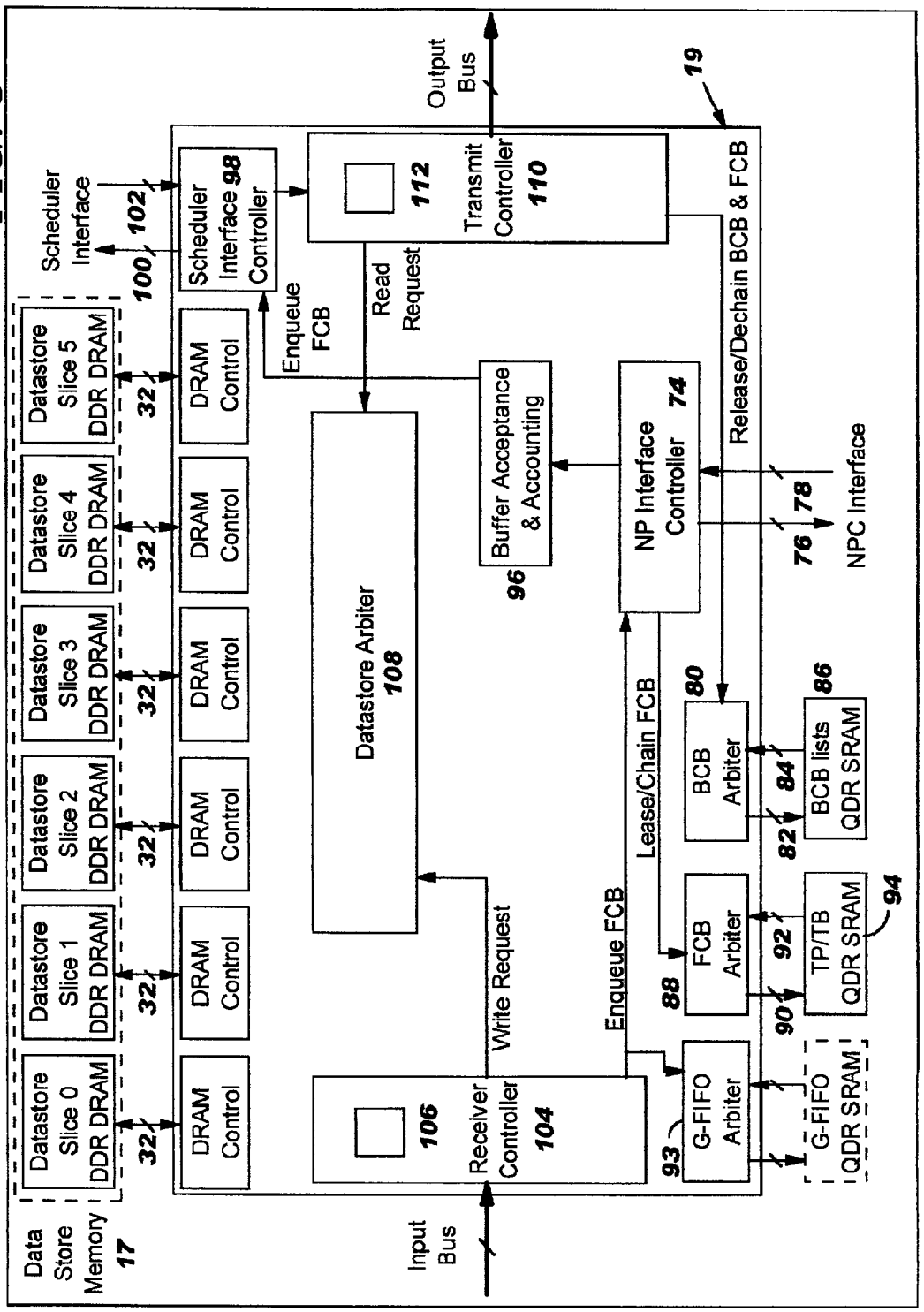
FIG. 3 shows a block diagram of the Data Flow Chip.

FIG. 3 shows a block diagram of the Data Flow Chip. The Data Flow Chip serves as a primary data path for transmitting and receiving data via network port and/or switch fabric interface. The Data Flow Chip provides an interface to a large data store memory labeled data store slice 0 through data store slice 5. Each data store slice is formed from DDR DRAM. The data store serves as a buffer for data flowing through the Network Processor subsystem. Devices in the Data Flow Chip dispatches frame headers to the Network Processor Complex Chip for processing and responds to requests from the Network Processor Complex Chip to forward frames to their target destination.

The Data Flow Chip has an input bus feeding data into the Data Flow Chip and output bus feeding data out of the data flow chip. The bus is 64 bits wide and conforms to the Optical Internetworking Forum's standard interface known as SPI-4 Phase-1. However, other similar busses could be used without deviating from the teachings of the present invention. The slant lines on each of the busses indicate that the transmission line is a bus. Network Processor (NP) Interface Controller 74 connects the Data Flow Chip to the Network Processor Complex (NPC) Chip. Busses 76 and 78 transport data from the NP interface controller 74 into the NPC chip and from the NPC chip into the NP Interface Controller 74. BCD arbiter 80 is coupled over a pair of busses 82 and 84 to storage 86. The storage 86 consists of QDR SRAM and stores Buffer Control Block (BCB) lists. Frames flowing through Data Flow Chip are stored in a series of 64-byte buffers in the data store memory. The BCB lists are used by the Data Flow Chip hardware to maintain linked lists of buffers that form frames. FCB arbiter 88 is connected over a pair of busses 90 and 92 to memory 94. The memory 94 consists of QDR SRAM and stores Frame Control Blocks (FCB) lists. The FCB lists are used by the Data Flow Chip hardware to maintain linked lists that form queues of frames awaiting transmission via the Transmit Controller 110. G-FIFO arbiter is connected over a pair of busses to a memory. The memory consists of QDR SRAM and stores G-Queue lists. The G-Queue lists are used by the Data Flow Chip hardware to maintain linked lists that form queues of frames awaiting dispatch to the NPC Chip via the NP Interface Controller 74.

Still referring to FIG. 3, the NP Interface Controller 74 is connected to buffer acceptance and accounting block 96. The buffer acceptance and accounting block implements well known congestion control alogrithms such as Random Early Discard (RED). These algorithms serve to prevent or relieve congestion that may arise when the incoming data rate exceeds the outgoing data rate. The output of the buffer acceptance and control block generates an Enqueue FCB signal that is fed into Scheduler Interface controller 98. The Scheduler Interface controller 98 forms the interface over bus 100 and 102 into the scheduler. The Enqueue FCB signal is activated to initiate transfer of a frame into a flow queue maintained by the Scheduler Chip.

Still referring to FIG. 3, the Data Flow Chip includes a Receiver Controller 104 in which Receiver port configuration device 106 (described hereinafter) is provided. The function of receiver controller 104 is to receive data that comes into the Data Flow Chip and is to be stored in the data store memory. The receiver controller 104 on receiving data generates a write request signal which is fed into data store arbiter 108. The data store arbiter 108 then forms a memory vector which is forwarded to one of the DRAM controllers to select a memory over one of the busses interconnecting a data store slice to the Data Flow Chip.

The Receiver port configuration circuit 106 configures the receive port into a port mode or a switch mode. If configured in port mode data is received or transmitted in frame size block. Likewise, if in switch mode data is received in chunks equivalent to the size of data which can be transmitted through a switch. The transmit controller 110 prepares data to be transmitted on SPI-4 Phase-1 to selected ports (not shown). Transmit Port configuration circuit 112 is provided in the transmit controller 110 and configures the transmit controller into port mode or switch mode. By being able to configure either the receive port or the transmit port in port or switch mode, a single Data Flow Chip can be used for interconnection to a switch device or to a transmission media such as Ethernet or POS communications network. In order for the transmit controller 110 to gain access to the data store memory the transmit controller 110 generates a read request which the data store arbiter uses to generate a memory vector for accessing a selected memory slice, to read information therefrom.

Still referring to FIG. 3, the transmit and receive interfaces can be configured into port mode or switch mode. In port mode, the data flow exchanges frames for attachment of various network media such as ethernet MAC or Packet Over SONET (POS) framers. In one embodiment, in switch mode, the data flow chip exchanges frames in the form of 64-byte cell segments for attachment to a cell-based switch fabric. The physical bus implemented by the data flow's transmit and receive interfaces is OIF SPI-4 Phase-1. Throughput of up to 14.3 Gbps is supported when operating in switch interface mode to provide excess bandwidth for relieving Ingress Data Store Memory congestion. Frames may be addressed up to 64 target Network Processor subsystems via the switch interface and up to 64 target ports via the port interface. The SPI-4 Phase-1 interface supports direct attachment of industry POS framers and may be adapted to industry Ethernet MACs and to switch fabric interfaces (such as CSIX) via programmable gate array (FPGA logic).

Still referring to FIG. 3, the large data store memory 17, attached to the Data Flow Chip 19, provides a network buffer for absorbing traffic bursts when the incoming frames rate exceeds the outgoing frames rate. The memory also serves as a repository for reassembling IP fragments and as a repository for frame awaiting possible retransmission in applications like TCP termination. Six external 32-bit DDR DRAMs are supported to provide sustained transmit and receive bandwidth of 10 Gbps for the port interface and 14.3 Gbps for the switch interface. It should be noted that these bandwidths are examples and should not be construed as limitations on the scope of the present invention. Additional bandwidth is reserved direct read/write of data store memory by Network Processor Complex Chip picocode.

The Data Store memory is managed via link lists of 64-byte buffers. The six DDR DRAMs support storage of up to 2,000,000 64-byte buffers. The link lists of buffers are maintained in two external QDR SRAMs 86 and 94 respectively. The data flow implements a technique known as ("Virtual Output Queueing") where separate output queues are maintained for frames destined for different output ports or target destinations. This scheme prevents "head of line blocking" from occurring if a single output port becomes blocked. High and low priority queues are maintained for each port to permit reserved and nonreserved bandwidth traffic to be queued independently. These queues are maintained in transmit controller 110 of the Data Flow Chip.

Figure 4:
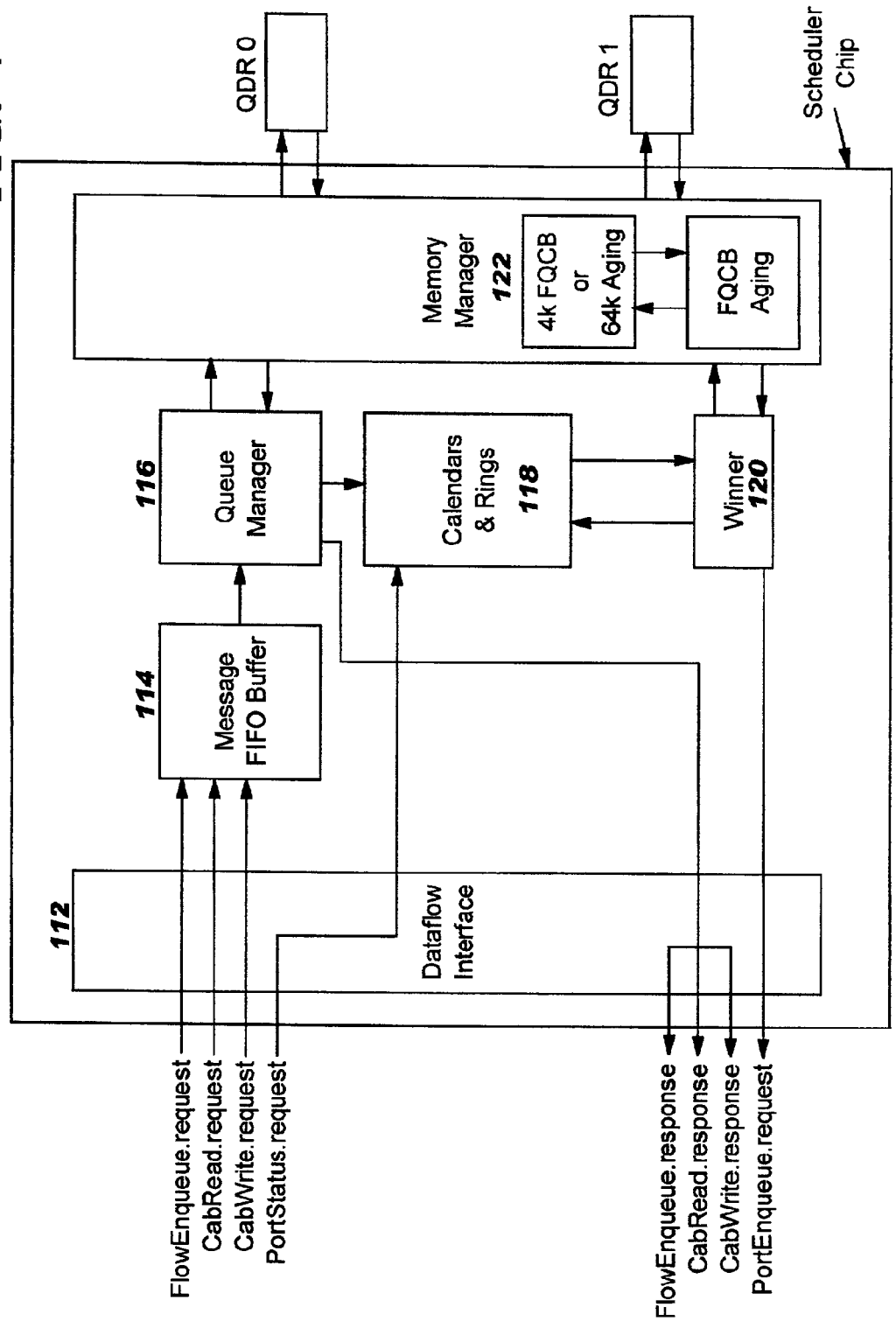
FIG. 4 shows a block diagram of the Scheduler Chip.

FIG. 4 shows a block diagram for the Scheduler Chip. The Scheduler Chip is optional but provides enhanced quality of service to the Network Processor subsystem, if used. The Scheduler permits up to 65,536 network (traffic "flows" to be individually scheduled per their assigned quality of service level). The Scheduler Chip includes data flow interface 112, message FIFO buffer 114, queue manager 116, calendars and rings 118, winner 120, memory manager 122, and external memory labeled QDR 0 and QDR 1. The named components are interconnected as shown in FIG. 4. The Data Flow Bus Interface provides the interconnect bus between the Scheduler and the Data Flow Chip. Chipset messages are exchanged between modules using this bus. The interface is a double data source synchronous interface capable of up to 500 Mbps per data pin. There is a dedicated 8-bit transmit bus and a dedicated 8-bit receive bus, each capable of 4 Gbps. The messages crossing the interface to transport information are identified in FIG. 4.

The message FIFO buffer 114 provides buffering for multiple Flow Enqueue.Request, CabRead.request and CabWrite.request messages. In one embodiment the buffer has capacity for 96 messages. Of course numbers other than 96 can be buffered without deviating from the scope or spirit of the invention. The Scheduler processes these messages at a rate of one per TICK in the order on which they arrive. If messages are sent over the Chip to Chip interface (details below) at a rate greater than one per TICK they are buffered for future processing.

Still referring to FIG. 4, the Queue manager block 116 processes the incoming message to determine what action is required. For a flow enqueue.request message the flow enqueue information is retrieved from memory and examined to determine if the frame should be added to the flow queue frame stream or discarded. In addition, the flow queue may be attached or calendared for servicing in the future, CabRead.request and CabWrite.response and CabWrite.response messages respectively.

The Calendars and Rings block 118 are used to provide guaranteed bandwidth with both a low latency sustainable (LLS) a normal latency sustainable (NLS) packets rate. As will be discussed below there are different types of rings in the Calendars and Rings block. One of the rings WFQ rings are used by the weighted fear queueing algorithm. Entries are chosen based on position in the ring without regard to time (work conserving).

Winner block 120 arbitrates between the calendar and rings to choose which flow will be serviced next.

The memory manager coordinates data, reads and writes from/to the external QDR 0, QDR 1 and internal Flow Queue Control Blocks (FQCB)/aging array. The 4K FQCB or 64K aging memory can be used in place of QDR 0 to hold time-stamped aging information. The FQCB aging memory searches through the flows and invalidates old timestamps flows. Both QDR 0 and QDR 1 are external memories storing frame control block (FCB) and FQCB.

The Scheduler provides for quality of service by maintaining flow queues that may be scheduled using various algorithms such as "guaranteed bandwith", "best effort", "peak bandwidth", etc. QDR 0 and QDR 1 are used for storing up to 64K flow queues for up to 256K frames actively queued. The Scheduler supplements the data flows congestion control algorithm by permitting frames to be discarded based on per flow queue threshold.

Still referring to FIG. 4, the queue manager 116 manages the queueing function. The queueing function works as follows: a link list of frames is associated with the flow. Frames are always enqueued to the tail of the link list. Frames are always dequeued from the head of the link list. Frames are attached to one of the four calendars (not shown) in block 118. The four calendars are LLS, NLS, PBS, WFQ. Selection of which flow to service is done by examining the calendar in this order LLS, NLS, PBS and WFQ. The flow queues are not grouped in any predetermined way to target port/target blade. The port number for each flow is user programmable via a field in the FQCB. All flows with the same port id are attached to the same WFQ calendar. The quality of service parameter is applied to the discard flow. The discard flow address is user-selectable and is set up at configuration time.

As stated above there are four calendars. The LLS, NLS and PBS are time-based. WFQ is wait-based. A flow gets attached to a calendar in a manner consistent with its quality of service parameters. For example, if a flow has a guaranteed bandwidth component it is attached to a time-based calendar. If it has a WFQ component it is attached to the WFQ calendar.

Port back pressure from the data flow to the scheduler occurs via the port status that request message originated from the Data Flow Chip. When a port threshold is exceeded, all WFQ and PBS traffic associated with that port is held in the Scheduler (the selection logic doesn't consider those frames potential winners). When back pressure is removed the frames associated with that port are again eligible to be a winner. The Scheduler can process one frame, dequeue every 36 nanoseconds for a total of 27 million frames/per second. Scheduling rate per flow for LLS, NLS, and PBS calendars range from 10 Gbps to 10 Kbps. Rates do not apply to the WFQ calendar.

Quality of service information is stored in the flow queue control blocks FQCBs QDR 0 and QDR 1. The flow queue control blocks describe the flow characteristics such as sustained service rate, peak service rate, weighted fair queue characteristic, port id, etc. When a port enqueue request is sent to the Scheduler the following takes place:

Frame is tested for possible discard using 2 bits from PortEnqueue plus flow threshold in FQCB. If the frame is to be discarded the FQCB pointer is changed from the FQCB in PortEnqueue.request to the discard FQCB.
  The frame is added to the tail end of the FCB chain associated with the FQCB
  If the flow is eligible for a calendar attach, it is attached to the appropriate calendar (LLS, NLS, PBS, or WFQ).

As time passes, selection logic determines which flow is to be serviced (first LLS, then NLS, then PBS, then WFQ). If port threshold has been exceed, the WFQ and PBS associated with that port are not eligible to be selected.

When a flow is selected as the winner, the frame at the head of the flow is dequeued and a PortEnqueue.Request message is issued.

If the flow is eligible for a calendar re-attach, it is re-attached to the appropriate calendar (LLS, NLS, PBS, or WFQ) in a manner consistent with the QoS parameters.

Figure 5:
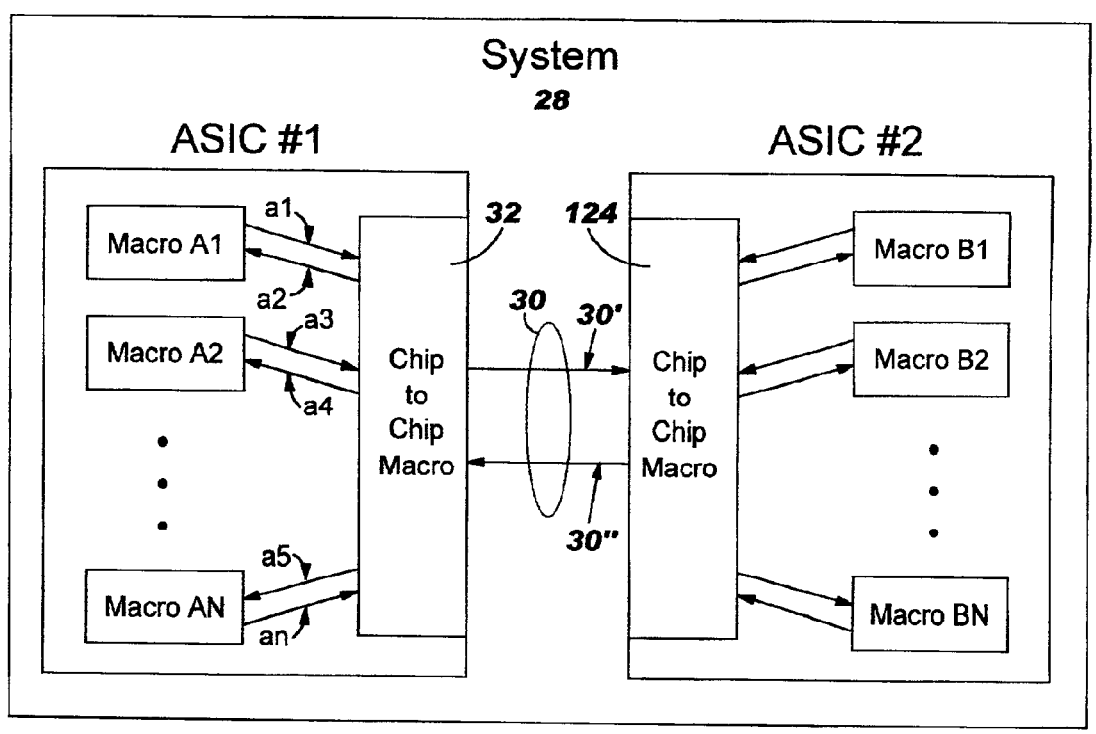
FIG. 5 shows a block diagram of the Chip to Chip Macro interconnecting two chips labeled ASIC #1 and ASIC #2.

FIG. 5 shows a block diagram of System 28 according to the teachings of the present invention. System 28 includes ASIC #1 interconnected by Chip to Chip Interface Bus Subsystem 30 to ASIC #2. Even though the interconnecting devices are shown as ASICs this should not be construed as a limitation upon the scope of this invention, since the interconnecting devices can be other modules such as the Network Processor (NP) Complex Chip, the Data Flow Chip or Scheduler Chip. The circuits on ASIC #1 are grouped into functional blocks termed Macro A1 through Macro AN. Each macro is connected by appropriate transmit and receive busses (labelled a1, a2, a3, a4, an) to Chip to Chip Macro 32. Likewise, ASIC #2 includes a plurality of macros B1 through BN coupled by appropriate transmit and receive busses to Chip to Chip Macro 124. The communication between ASIC #1 and ASIC #2 is effectuated by Chip to Chip Macro 32, Chip to Chip Interface Bus 30, and Chip to Chip Macro 124.

The term Macro as used in this application refers to a collection of circuits, on an ASIC or chip, that performs a specific function. Some examples of functions often implemented as a macro are a microprocessor, Ethernet controller, PCI bus interface, encryption/decryption engine, etc. Multiple macros are typically combined on an ASIC to perform a larger function as required by an application. Once a macro is designed and verified it can be easily reused in different applications thereby reducing the amount of redesign required for each new ASIC application. In this regard the Chip to Chip Macros 32 and 124 comprise a collection of circuits that are specifically designed to facilitate efficient communication between two or more ASIC components. For clarity, Chip to Chip Macros, such as 32 and 124, provide intercommunication between chips whereas On Chip Macros, such as A1 through AN and B1 through BN, provide On Chip functions.

Still referring to FIG. 5, the Chip to Chip Macro 32 and Chip to Chip Macro 124 aggregates all communication between ASIC #1 , ASIC #2 onto the single Chip to Chip interface bus 30 that connects the two ASICs. By so doing, the number of I/O pins used to effectuate communication can be significantly reduced. In operation if Macro A1 wishes to communicate with Macro B1, Macro A1 asserts a request signal indicating its desire to communicate with Macro 51. The request is intercepted by Chip to Chip Macro 32 and is formed into a packet of information called a "message" that is interleaved with other requests flowing between macros on ASIC #1 to macros on ASIC #2. An identification called a message ID is preappended to the message that indicates it is targeted for Macro B1. The request message is transferred from Chip to Chip Macro 32 in ASIC #1 to Chip to Chip Macro 124 on ASIC #2 via a high speed bus called Chip to Chip Interface Bus 30. As will be explained subsequently Chip to Chip interface Bus 30 includes independent transmission busses carrying information between the two ASICs. By way of an example, bus 30' transmits information from Chip to Chip Macro 32 to Chip to Chip Macro 124. Likewise, 30" transports information from Chip to Chip Macro 124 to Chip to Chip Macro 32. Upon reception of the request message by Chip to Chip Macro 124 on ASIC #2, the message ID is decoded to determine that the request is destined for Macro B1. The Chip to Chip Macro 124 in ASIC #2 then asserts the request to Macro B1 as if it were directly attached to A1. If Macro 81 needs to send a response to the request it uses the same technique to cause the Chip to Chip Macros 32 and 124 to forward a response message back to Macro A1. If no response is required then the operation is complete. The Chip to Chip Macros 32 and 124 also support requests flowing in the opposite direction (i.e. a request from Macro 61 to Macro A1).

Pipelining of multiple "transactions" is also possible between macros as permitted by the specific implementation of the macro. For example, Macro A1 may assert multiple requests to Macro B1 before receiving the response for the first request. Pipelining minimizes the effect of the additional latency that may be incurred between the two islands or Macros due to insertion of the Chip to Chip Macros in the patch. In a pipelined implementation, macro-to-macro flow control functions may be necessary to prevent one macro from overrunning another macro with requests. Various flow control functions can be used. Examples of flow control techniques can be applied here are as follows:

1. Establishment of a window size that limits the number of outstanding transactions between macros,
2. Exchange of credit values between macros to signal number of message that can be sent, or
3. Use of sideband signals to exchange flow control information.

Details of these flow control methods are outside the scope of the present invention and will not be discussed further. It should be noted that by aggregating all communication between the Macro peers, such as Macros A1 and B1 or A2 and B2, etc., into a common bus permits a more efficient use of the data transfer bandwidth on each I/O pin of the Chip to Chip bus interface. One pair of macros may utilize bandwidth that is unused by another pair of macros.

Figure 5A:
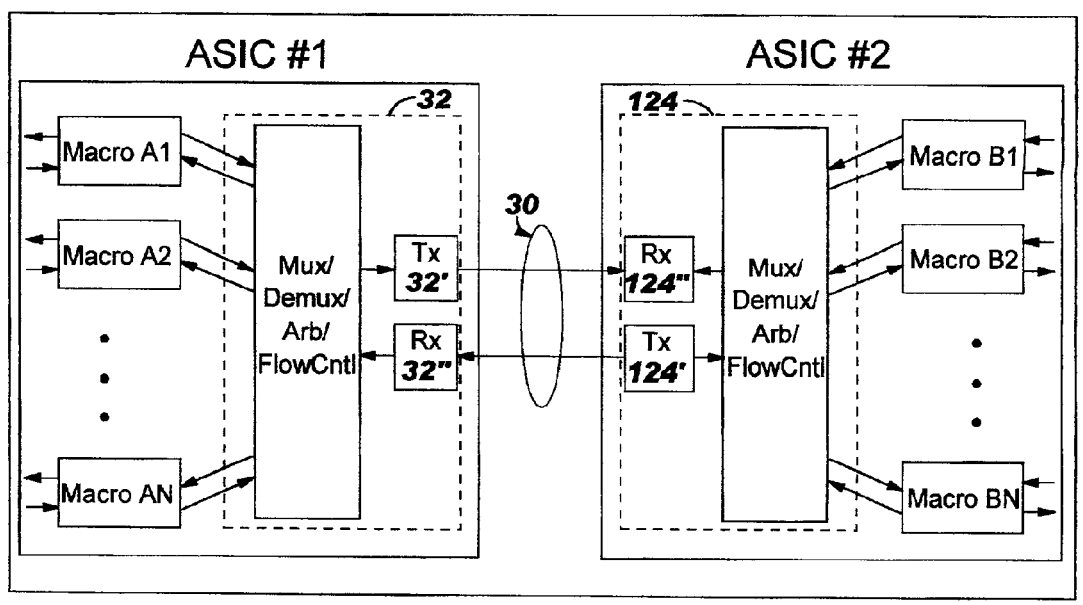
FIG. 5A shows a more detailed block diagram of Chip to Chip Macro interconnecting two chips.

FIG. 5A shows a more detailed block diagram of the Chip to Chip Macros 32 and 124 that are used for communicating between ASIC #1 and ASIC #2. Items which are like items discussed with FIG. 5 are identified with like numerals or like names but are not discussed further. Chip to Chip Macro 32 and Chip to Chip Macro 124 include transmit (Tx) circuit 32', Receive (Rx) circuit 32", Tx circuit 124' and Rx circuit 124". The Tx circuits 32', 124' and Rx circuits 32", 124" perform transmit and receive functions on respective ones of the Chip to Chip Macros. The Tx and Rx circuits on each of the Chip to Chip Macros are operatively coupled to a control circuit block which provides Multiplexing (MUX), demultiplexing (DEMUX), Arbitration (Arb) and Flow Control functions to signals flowing threrethrough. The control circuit block is identified by the names of the functions it provides and is described in greater detail hereinafter.

Figure 9:
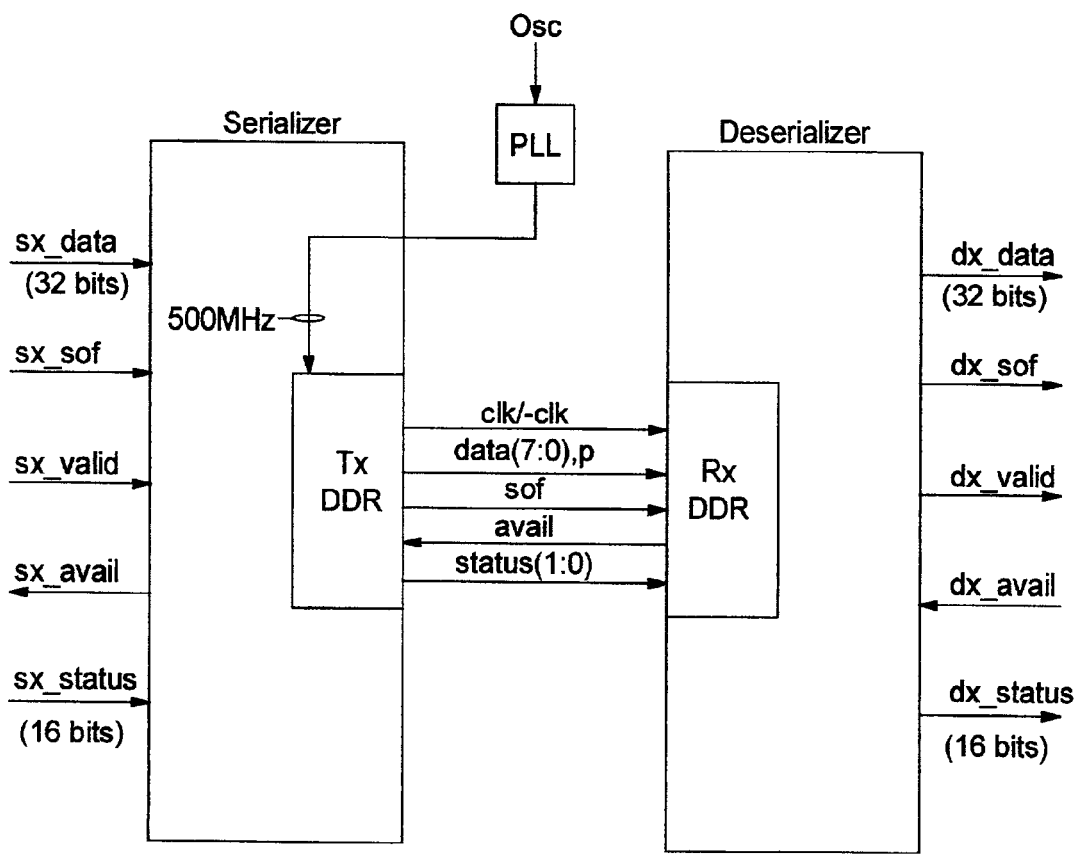
FIG. 9 shows a block diagram of the Serializer/Deserializer.

FIG. 9 shows a graphic representation of the Chip to Chip Bus Interface System 30 interconnecting ASIC #1 and ASIC #2. The Chip to Chip Bus Interface includes two identical but separate bus subsystems 33 and 35. Since the bus systems are identical only one will be discussed with the understanding that the discussion is intended to cover both of the subsystems. Each of the Chip to Chip Bus Interface Systems includes data bus, parity bus, start of message (SOM) signal line, Clock and N-clock bus, and Available signal line. The directions of signal transmission are shown by the direction of the arrows. The data bus can be 8, 16, or 32-bit data lines used for transfer of message data between Chip to Chip Macros. Other embodiments could use a different number of data bits.

The parity bus can be 1, 2 or 4-bit parity signals used for error checking of data bus. Alternately, one bit of parity may optionally apply to 16 or 32 bits of data. Other embodiments could choose to use no parity, or other error checking schemes such as error checking and correcting (ECC) codes.

The start of message (SOM) is a 1-bit signal line carrying a 1-bit control signal used to delineate the start of a message transfer on the Chip to Chip Bus. It is also used to infer the end of a message as one message will always be followed by another message or an "IDLE" message. SOM is driven active high during the first transfer of a message.

The available signal line carries a 1-bit signal that provides bus level flow control. If the source Chip to Chip Macro transmits data faster than it can be received by the destination Chip to Chip Macro, then the destination Chip to Chip may deactivate the available signal to request that the source Chip to Chip Macro pause transmission until the available signal is reactivated. The available signal is used for speed matching. When the source and destination ASICs are operating at different clock frequencies other embodiments may not include the signal if both ASICs are operating at the same clock rate.

The clock, N clock is a 2-bit bus that provides a positive and negative version of the clock. Data is transferred on the rising edge of each clock. Other embodiments may use a single clock signal without deviating from the teaching of the present invention.

Even though other clocking speeds and logic types may be used without departing from the teachings and spirit of the present invention, in the preferred embodiment of this invention the bus is clocked at a rate of up to 250 Mhz with data being transferred in both the rising and falling edge of the clock (double data-rate). Other embodiments could use different frequencies or single data-rate clocking. All signals in the bus interface are unidirectional for optimal operation at high clock rates. Other embodiments could use bidirectional bus signals without deviating from the teaching of the present invention. Finally, the I/O driver/receiver technology is single-ended high speed transceiver logic (HSTL) defined by EIA/JEDEC standard ELIA/JESD8-6. Other embodiments could use I/O technologies such as LVDS, TTL, etc.

Figure 6:
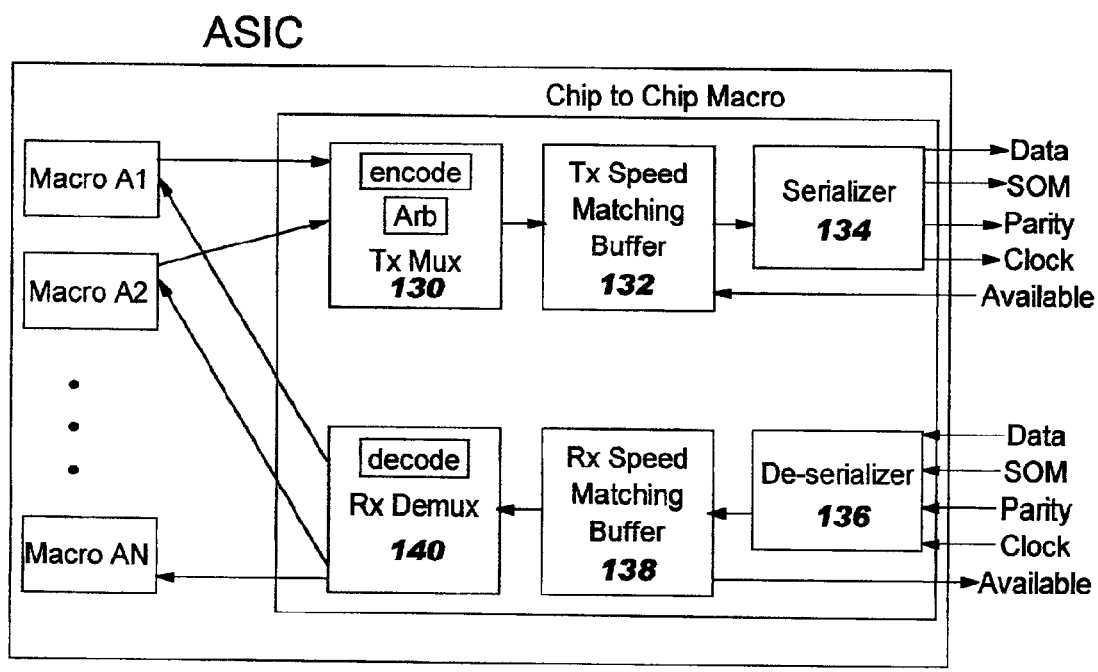
FIG. 6 shows a block diagram of the Chip to Chip macro.
Figure 7:
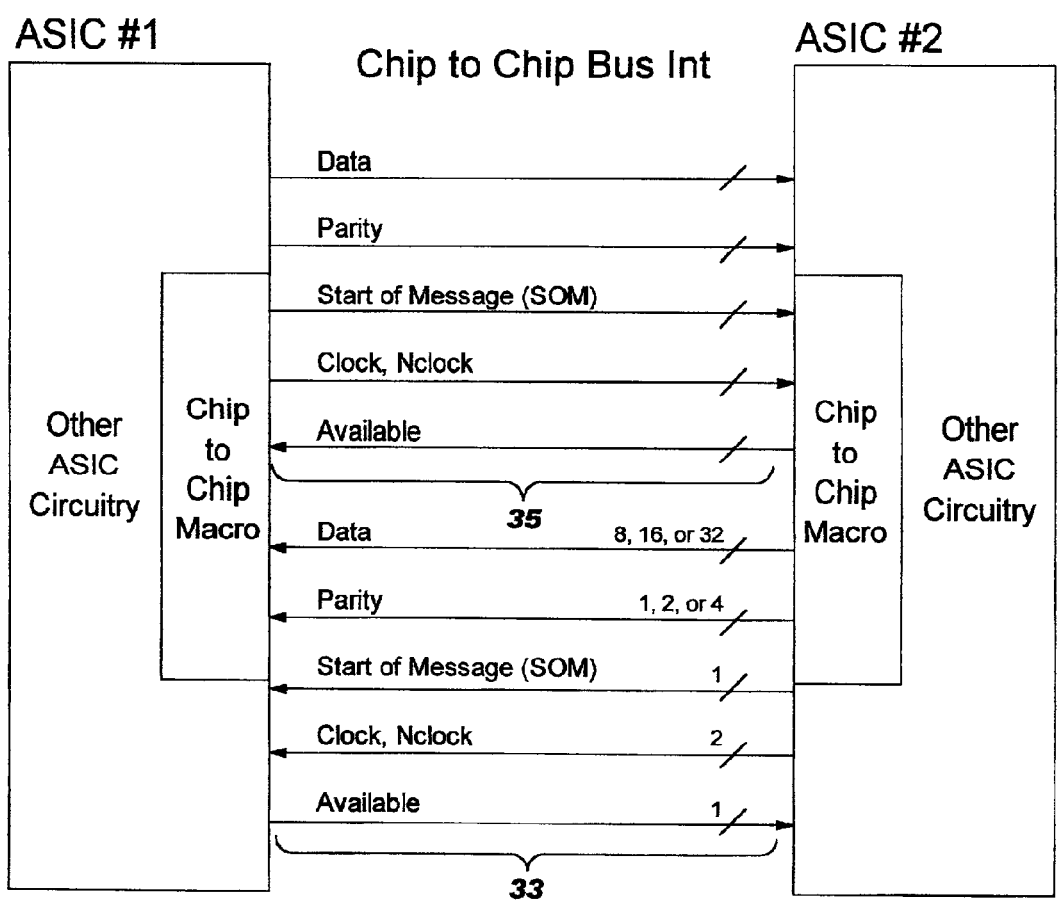
FIG. 7 shows a block diagram of the Chip to Chip Interface Bus Structure.

FIG. 6 shows a block diagram of the Chip to Chip macro according to the teachings of the present invention. It should be noted that the Chip to Chip macros used in this application are identical, therefore the showing in FIG. 6 is intended to cover the description of the other macros on ASIC #2 (FIG. 5). In FIG. 6 the Chip to Chip macro is shown embedded in an ASIC and interconnected through appropriate busses to On Chip Macros A1 through Macro AN. The signal lines (such as DATA, SOM, etc.) exiting and entering the ASIC have already been described relative to FIG. 7 above and will not be repeated here. The Chip to Chip macro includes a transmit path and a receive path. Information from one ASIC to the other is transmitted over the transmit path. Likewise, information from another ASIC (source ASIC) to the destination ASIC is received over the receive path. The transmit path includes Tx MUX (transmitter multiplexer) 130, Tx Speed matching buffer 132 and Serializer 134. The receive path includes Deserializer 136, Rx Speed matching buffer 138 and Rx Demux (receive demultiplexor) 140.

Still referring to FIG. 6, the transmit path includes the following submacros:

TxMux or Transmitter Multiplexor 130—Arbitrates among each of the requesting On Chip Macros (Macros A1 through AN) to determine which request will be propagated as a message onto the Chip to Chip Bus. The Macros requiring service activate a request signal to the TxMux. The arbitration algorithm implemented by the TxMux may apply a fixed priority, round-robin or other arbitration scheme as required per the application to determine which Macro is serviced next. The TxMux then encodes and transfers data provided by the requesting Macro as a message to the Speed Matching Buffer. The TxMux activates an acknowledge signal to the requesting Macro to notify it the message has been transmitted. If no Macros are requesting service, then the TxMux generates special idle messages with a Message_ID of x'80'. These idle messages are filtered (deleted) by the RxDemux in the receive path of the target ASIC.

Tx Speed Matching Buffer (TXSMB) 132—Compensates for differences in the rate at which data is written by the TxMux and data is read by the Serializer. In one design the SMB includes a small buffer (e.g. 8 entries). The buffer is written using the clock rate of the internal Macros and TxMux logic, and is read using a clock derived by the Serializer function from the input Chip to Chip Bus. This permits the internal circuitry of the ASIC to operate at a different clock frequency than the Chip to Chip Bus. The TxSMB may become full if the internal ASIC transfer rate is faster than the Chip to Chip Bus transfer rate, or if the "Available" signal is de-asserted by the target ASIC chip. If this occurs, the TxSMB asserts a back-pressure signal to the TxMux logic via the Available signal line to temporarily stop further writes. If the transfer rate of the Chip to Chip Bus is faster than the internal ASIC, then the TxSMB may temporarily become empty preventing data from being sustained to the Serializer. If this occurs in the middle of a message, the SMB inserts special "idle" messages with an x'81' Message_ID that are propagated across the Chip to Chip Bus and are filtered (deleted) by the RxSMB on the receive path of the target ASIC.

Serializer 134—Performs a serialization function to permit a wide internal ASIC bus to be transferred at a higher clock rate over a narrower Chip to Chip Bus interface. In one embodiment the Serializer reduces a 128-bit internal ASIC bus at 125 Mbit/sec per signal to a 32-bit Chip to Chip Bus at 500 Mbit/sec per signal. Other reduction ratios can be designed without deviating from the teachings of the present invention. By using the Serializer the number of I/O pins required for communication between the ASICs are reduced. A more detailed description of the Serializer is given herein.

Still referring to FIG. 6, the Chip to Chip Macro's receive path consists of the following sub-macros:

De-serializer 136—Performs a de-serialization function to permit a narrow high speed Chip to Chip Bus Interface to be transferred at a lower clock rate over a wider internal ASIC bus. In one embodiment the De-serializer expands a 32-bit Chip to Chip Bus at 500 Mbit/sec per signal to a 128-bit internal ASIC bus at 125 Mbits/sec. The De-serializer minimizes the number of I/O pins required for communication between the ASICs. Data on the output bus of the De-serializer is written to Speed Matching Buffer 138. A more detailed description of the De-serializer is set forth herein.

Rx Speed Matching Buffer (RxSMB) 138—Compensates for differences in the rate at which data is written by the De-serializer and data is read by the RxDemux 140. The RxSMB 138 includes a small buffer (say 8 entries in one application). The buffer is written using a clock derived by the De-serializer from the Chip to Chip Bus, and is read using the clock rate of the RxDemux 140 and internal Macro logic. This permits the internal circuitry of the ASIC to operate at a different clock frequency than the Chip to Chip Bus. The RxSMB 138 may become full if the internal ASIC transfer rate is slower than the Chip to Chip Bus transfer rate. If this occurs, the RxSMB 138 de-asserts the "Available" signal to the TxSMB in the source ASIC chip to temporarily stop further transfers over the Chip to Chip Bus. The RxSMB 138 also filters (or deletes) special "idle" messages with a Message_ID of x'81' that are inserted by the TxSMB in the source ASIC chip when the buffer inside the TxSMB becomes temporarily empty.

RxDemux or Receiver Demultiplexor 140–Decodes the Message_ID field in the header of messages received from the RxSMB to determine which target Macro (Macros A1 through AN) the message is to be delivered to. A "valid" signal is activated to notify a target Macro that it is the intended destination. If the source ASIC has no messages to transmit, it sends special "idle" messages with a Message_ID of x'80'. These idle messages are filtered (deleted) by the RxDemux.

Figure 8:
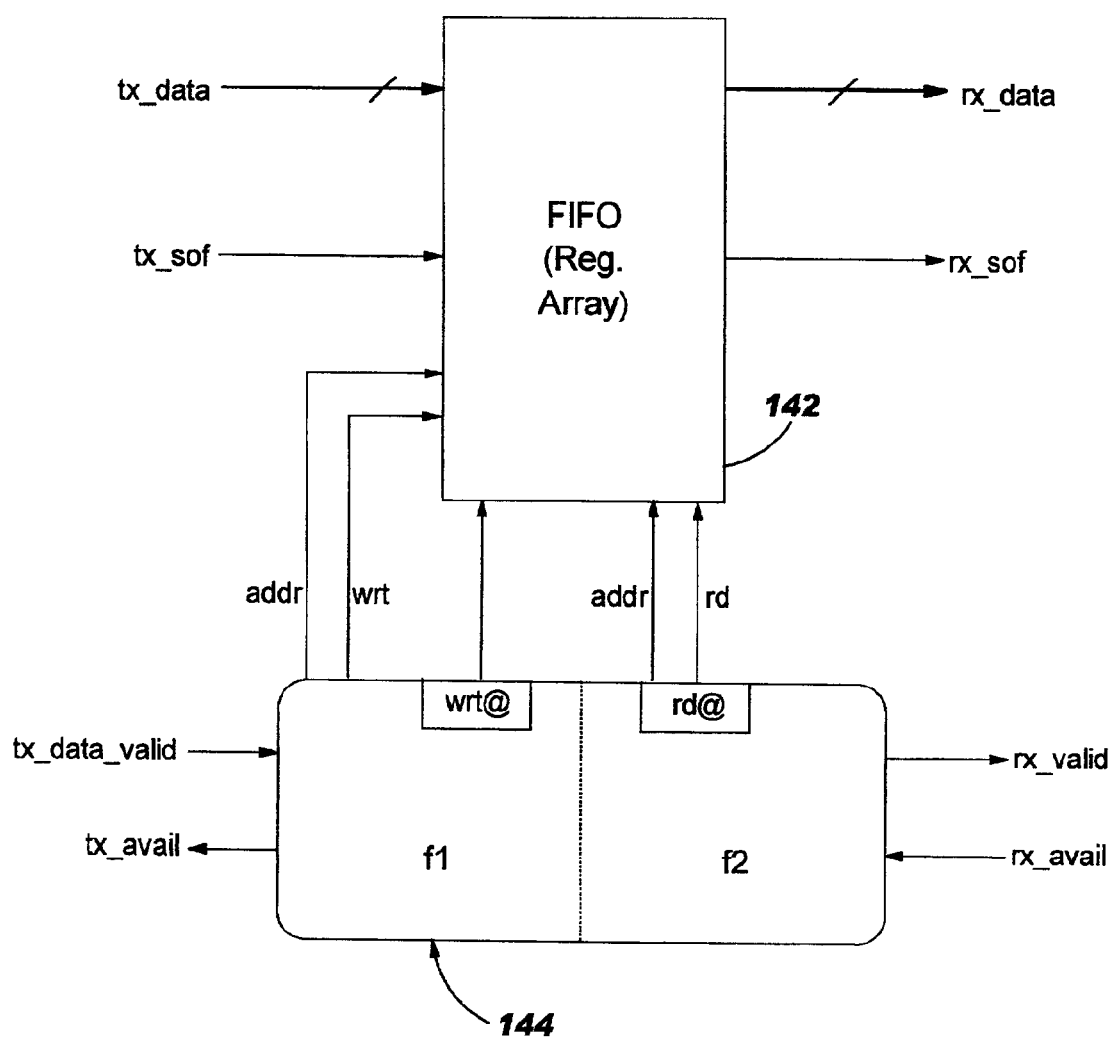
FIG. 8 shows a block diagram of the Speed Matching Buffer.

FIG. 8 shows a block diagram of the speed matching buffer that includes a RAM configured as a FIFO Register array 142 coupled to a controller 144. The FIFO Register array 142 stores data and the controller 144 provides necessary control signals that write data into and read data from the RAM. In particular, data to be written into the RAM is provided on the bus labelled tx_data with the signals on the line labelled tx_sof) active. The controller 144 generates address location signals on the line labelled addr and write signals on the line labelled wrt. The information is written into the buffer at a frequency f1. The signal on the line labelled tx_data_valid is an indication to the controller that valid data is on the tx_data bus. If the RAM is full with data the controller 144 generates the signal tx available which informs the sender to stop sending data.

Still referring to FIG. 8 to read the RAM controller 144 generates address (addr) signals, indicating location to be read on the line labelled addr and read signal on the line labelled rd. A signal indicating that the data on bus rx_data is valid is generated and output on the line labelled rx_valid. The signal on line labelled rx_avail informs the controller to stop sending data. Data is read out on the bus labelled rx_data. The signal on the line labelled rx_sof indicates the start of frame. It should be noted that f1 and f2 are different. Therefore, the buffer can be written at a first speed and read at a second speed or visa versa whereby the first speed and second speed are different.

Turning to FIG. 6 for the moment, Serializer 134 transmits data at a very high rate with a relatively narrow footprint to a De-serializer (not shown) on another ASIC (not shown). Likewise, De-serializer 136 receives data from a Serializer (not shown) on the other ASIC (not shown).

FIG. 9 is a graphical representation of a Serializer on one ASIC connected by the transmission system to the De-serializer on the other ASIC. The Serializer includes circuits that cause data to be clocked at a much faster rate than the speed at which the data was written into the speed matching buffer. In one embodiment of the present invention a 500 MHz clock clocked data at DDR (double density rate) across the high speed interface. The clock is generated from a 62.5 MHz oscillator and phase lock loop (PLL). The De-serializer receives the data, expands the footprint and reduces the data rate. It should be noted that the data rate and other specifics are described for purposes of describing the invention and does not limit the invention in any way. As is used in this application, footprint is synonymous with bus width. As a consequence an eight-bit bus has a narrower footprint than a sixteen bit or thirty-two bit bus.

While the invention has been defined in terms of preferred embodiment in specific system environments, those of ordinary skill in the art will recognize that the invention can be practiced, with modification, in other and different hardware and software environments without departing from the scope and spirit of the present invention.

What is claimed is:

1. A system comprising:
   a first ASIC (Application Specific Integrated Circuit) including a first substrate;
   a plurality of On Chip Macros mounted on said first substrate;
   a second ASIC including a second substrate positioned in spaced relationship to said first substrate;
   a plurality of On Chip Macros mounted on said second substrate;
   a Chip to Chip Non-Serial Bus Interface subsystem operatively positioned to provide communications between the first ASIC and the second ASIC;
   at least one on-chip non-serial ASIC bus coupled to at least one of the on-chip macros on the first and the second ASIC, respectively, wherein number of bit lines in the on-chip non-serial bus is greater than the number of bit lines in the non-serial Bus Interface subsystem; and
   a Chip to Chip Macro subsystem operatively mounted on the first ASIC and the second ASIC, said Chip to Chip Macro subsystem receiving data with a first footprint equivalent to number of bit lines in the on-chip non-serial ASIC bus reducing the first footprint so the data matches footprint of the chip to chip non-serial bus interface subsystem.

2. The system of claim 1 wherein the Chip to Chip bus interface subsystem includes a first transmission system transmitting data from the first ASIC to the second ASIC; and
   a second transmission system transmitting data from the second ASIC to the first ASIC.

3. The system of claim 2 wherein the first transmission system includes a first unidirectional data bus;
   a first unidirectional parity bus;
   a first unidirectional start of message control line; and
   a first unidirectional clock bus.

4. The system of claim 3 wherein the first transmission system further includes a first control line that transmits a signal in a direction opposite to signal transmission on other lines in said first transmission system, said signal inhibiting a Macro on a selected ASIC from transmitting data.

5. The system of claim 2 wherein the second transmission system includes a set of transmission lines substantially similar to those set forth in claim 3.

6. The system of claim 5 further including a second control line that transmits signals in a direction opposite to signal transmission on the set of transmission lines in said second transmission system.

7. The system of claim 1 wherein the Chip to Chip Macro subsystem includes a first Chip to Chip Macro operatively mounted on the first ASIC; and a second Chip to Chip macro operatively mounted on the second ASIC.

8. The system of claim 7 wherein the first Chip to Chip macro or the second Chip to Chip macro includes a transmit (Tx) channel; and a Receive Channel wherein said Tx channel includes a transmitter Multiplexor;

a transmitter Speed Matching Buffer connected in series to the transmitter Multiplexor; and a Serializer connected in series to the transmitter speed matching buffer; and said Receive Channel includes a De-serializer; Receive (Rx) Speed Matching buffer connected in series to the De-Serializer and a Rx De-multiplexor connected in series to the Rx speed Matching buffer.

9. The system of claim 8 wherein the Tx Multiplexor further includes arbitration devices receiving requests from multiple Macros and granting priority to transmit to one of said multiple macros; and a generator, response to a request from one of said multiple macros, to generate a message based upon information in said request from one of said multiple macros and forward said message to the speed matching buffer.

10. The system of claim 8 wherein the Rx De-mulitplexor includes a decoder that decodes selected fields in messages to determine which Macro should receive the message.

11. The system of claim 1 wherein the first ASIC includes a Network Processor Complex Chip and the second ASIC includes a Data Flow Chip.

12. The system of claim 1 where the first ASIC includes a Data Flow Chip and the second ASIC includes a Scheduler chip.

13. A Macro for interconnecting chips comprising:

a Transmit channel; and a Receive channel; said Transmit Channel including an arbitrator that arbitrates Requests generated from multiple Requesters and granting priority to one of the requests;

a generator responsive to said one of the requests to generate a first message based upon information in said one of the requests;

a first Speed Matching Buffer that receives the first message; and a Serializer extracting the first message from said Speed Matching Buffer at a first data rate over a first parallel data bus and converting said message to a second data rate for transmission over a second parallel data bus wherein ratio of bit lines in the first parallel data bus and the second parallel data bus are different.

14. The Macro of claim 13 wherein the Speed Matching Buffer includes a RAM; and a controller coupled to said RAM, said controller causing data to be written in said RAM at a first frequency and read from said RAM at a different frequency.

15. The Macro of claim 14 further including circuit in said second Speed Matching Buffer to generate a control signal if said second speed matching buffer does not wish to receive additional data.

16. The Macro of claim 13 wherein the Receive Channel further includes a second Speed Matching Buffer that buffers messages received from another macro;

a De-serializer receiving the messages having a first footprint and second data rate from another macro, said De-serializer adjusting the second footprint and the second data rate of the messages from another macro and loading said message into the second Speed Matching Buffer; and a De-Multiplexor including circuits to extract said message from the Speed Matching Buffer, determining destination of said extracted message and forwarding the extracted message to determined destinations.

17. The Macro of claim 13 or claim 16 further including a Network Processor Complex Chip operatively coupled to said Macro.

18. The Macro of claim 13 or claim 16 further including a Scheduler Chip operatively coupled to said Macro.

19. The Macro of claim 13 or claim 16 further including a Data Flow Chip operatively coupled to the Macro.

20. A method comprising:

partitioning circuits into functional blocks on a first ASIC and a second ASIC;

generating Request signals by functional blocks on the first ASIC wanting to communicate with functional blocks on the second ASIC;

granting priority to one Request based upon a result of an arbitrator arbitrating between multiple Requests;

generating a message based upon information in the one Request;

buffering the message in a first buffer; and serializing buffered messages with a Serializer to permit data transmitted at a first data rate on a parallel internal ASIC bus to be transferred on another parallel bus at a higher data rate wherein the parallel internal ASIC bus includes more bit data line than the another parallel bus.

21. The method of claim 20 wherein the parallel internal ASIC bus is approximately 128 bits.

22. The method of claim 21 wherein the another parallel bus is approximately 32 bits and the higher data rate is approximately 500 Mbit/sec (per bit).

23. The method of claim 20 further including providing on the first ASIC a second buffer to receive messages from the second ASIC;

converting the message by a De-serializer from a first footprint, equivalent to a width of a first bus, and first data rate to a second footprint, equivalent to a width of a second bus, and second data rate; and writing converted messages into the second buffer.

24. The method of claim 23 further including extracting by a De-multiplexor messages from said second buffer;

determining by said De-multiplexor a destination for said extracted messages; and forwarding said extracted messages to the destination.

25. A system comprising:

a Data Flow Chip;

a first Chip to Chip Macro operatively mounted on said Data Flow Chip;

a Scheduler Chip;

a second Chip to Chip Macro operatively mounted on said Schedule Chip;

a transmission interface interconnecting the first Chip to Chip Macro and second Chip to Chip Macro.

26. A device comprising:

an ASIC having circuits that can be grouped into separate sub Macros; and a Chip to Chip Macro mounted on said ASIC, said Chip to Chip macro receiving data at a first data rate with a first footprint from selected ones of said sub Macros converting the data to a second footprint at a second data rate and transmitting the data at the second data rate and second footprint wherein said first footprint mirrors that of a first parallel bus having n bit data lines and said second footprint mirrors that of a second parallel bus having m bit data lines, with n greater (>) than m and n and m being numbers >1.

27. The device of claim 26 wherein the second footprint is includes fewer data lines than the first footprint and the second data rate is higher than the first data rate.

* * * * *